(No Model.)  2 Sheets—Sheet 1.

W. BUNTING, Jr.
Supply Tank for Water Closets.

No. 241,604. Patented May 17, 1881.

Witnesses:
E. Wolff
Jacob Felbel

Inventor:
William Bunting Jr.
By atty
J. N. McIntire

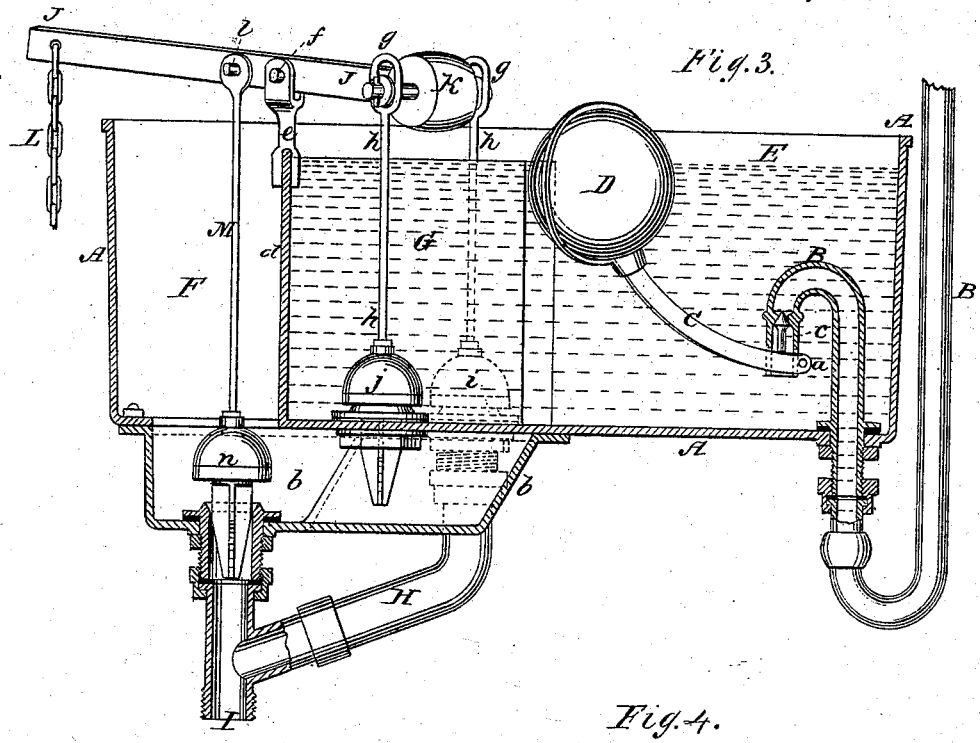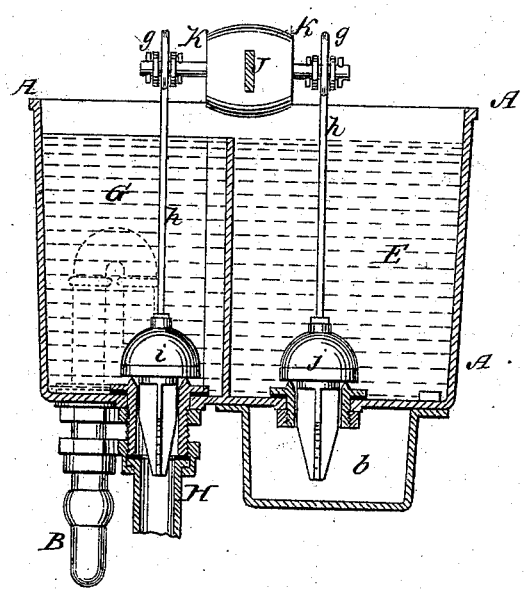

UNITED STATES PATENT OFFICE.

WILLIAM BUNTING, JR., OF FLUSHING, NEW YORK, ASSIGNOR TO HENRY C. MEYER & CO., OF SAME PLACE.

SUPPLY-TANK FOR WATER-CLOSETS.

SPECIFICATION forming part of Letters Patent No. 241,604, dated May 17, 1881.

Application filed October 12, 1880. (No model.)

*To all whom it may concern:*

Be it known that I, WILLIAM BUNTING, Jr., of Flushing, in the county of Queens and State of New York, have invented an Improved Supply-Tank for Water-Closets; and I do hereby declare that the following is a full and exact description thereof, reference being had to the accompanying drawings, making part of this application.

In the use of water-closet systems involving the use of a supply-tank or cistern, as heretofore employed, a fruitful source of uncleanliness has been the adherence of excrement to the walls of the bowl or hopper in the event of an insufficient flushing of the bowl after use, and the consequent drying of the foul matter on the bowl's walls, so that during the next use of the apparatus even an abundant flushing would fail to remove the hardened excrement. This difficulty has existed to the greatest extent in hopper-closets where the water does not stand high enough in the bowl to protect those portions of the walls on which excrement may lodge, and is, of course, aggravated where an insufficient flushing occurs, the result of which is an opportunity of the lodged excrement to dry on the walls of the hopper.

My invention has for its object to overcome this serious defect in this kind of water-closet apparatus; and to this end and object my invention consists in providing the tank or cistern which supplies water to the closet with means for effecting a slight flushing (or a thorough wetting) of the walls of the hopper or bowl preliminary to the use of the closet, in addition to those for effecting the usual after-wash, all as will be hereinafter more fully explained.

To enable those skilled in the art to which my invention relates to more fully understand it and to practice it, I will now proceed to explain it by reference to the accompanying drawings, making part of this specification, in which I have illustrated a water-closet cistern or tank-supply apparatus adapted to effect the purposes of my said invention.

Figure 1:
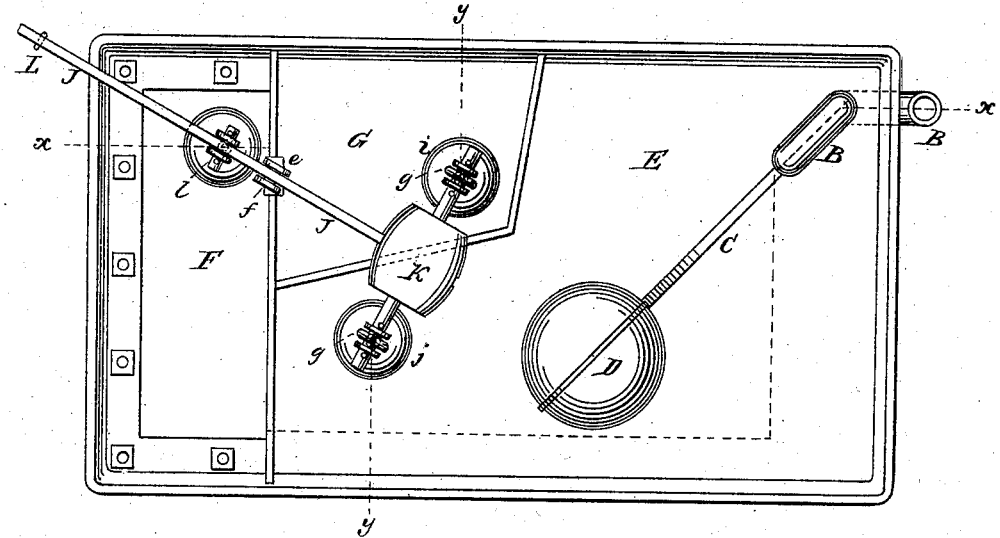
Figure 2:
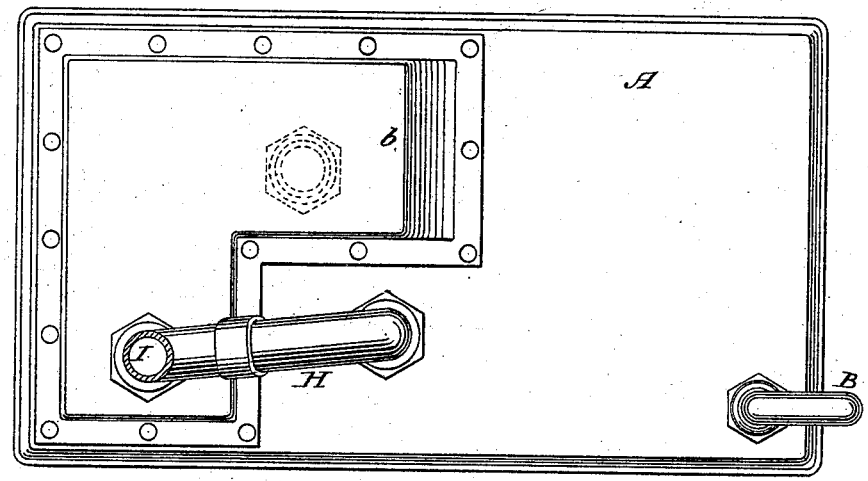

In the said drawings, Figure 1 is a top or plan view of the cistern or supply-tank with its appurtenances. Fig. 2 is a bottom view of the same. Fig. 3 is a vertical section at the line *x x* of Fig. 1; and Fig. 4 is a vertical section at the line *y y* of Fig. 1, and in these several figures the same part will be found designated (wherever seen in two or more figures) by the same letter of reference.

The cistern or tank A is of about the usual size and shape, and made of the ordinary material, and is provided with the usual supply-pipe B, furnished with a valve at *c*, that is opened and closed automatically by a lever, C, pivoted at *a*, and having a ball-float at D, all in a manner well known to those skilled in the art.

As clearly represented, the cistern has three compartments—viz., a main compartment at E, (see Fig. 1,) an auxiliary compartment at F, which is always in open communication (at its bottom) with the flushing-box *b*, and a supplementary compartment at G, from the bottom of which compartment G extends a branch pipe, H, leading into the pipe I, through which the usual water-supply for the flushing and after-wash is conducted from the compartment F and flushing-box *b*.

Upon the partition-plate *d* of the tank (or in some other suitable manner) is properly supported a stand, *e*, in the upper end of which is pivoted, at *f*, a lever, J, to one end of which is attached a cross-head, K, and to the other end of which is secured the upper end of the chain L, the lower end of which is connected with the seat of the closet. Either end of the cross-head K has connected to it by a yoke, *g*, the upper end of a valve-rod, *h*, and at the lower end of each rod *h* is a valve, one of which valves, *i*, has its seat at the mouth of the passage or water-way leading from the supplemental compartment G into the branch pipe H, and the other of which valves, *j*, has its seat at the passage-way leading from the main compartment E into the flushing-box *b*, which latter, as before remarked, is always in open communication with the auxiliary compartment F.

To the lever J is pivoted, at the point *l*, (see Fig. 3,) the upper end of another valve-rod, M, the valve *n* of which has its seat at the passage-way leading from the flushing-box *b* and chamber F into the pipe I, through which water is supplied to the hopper.

The operation of the contrivance shown in the drawings, and so far described as to the parts composing it, is as follows: Assuming the working parts to be in the positions seen in the drawings, (see Figs. 3 and 4,) which are those the parts occupy when the closet is in disuse, when the closet-seat is depressed (by the weight of the occupant) the pull-chain L pulls down the outer end of lever J, and thus effects simultaneously the lifting of valve j from its seat and the lowering of valve n onto its seat, whereby a communication is opened between the main compartment E and the box b, for the purpose of supplying the box b and compartment F with their complement of water, and the communication between b and the pipe I leading to the closet is closed, to prevent the escape of any of the water supplied to the parts b and F, all in about the usual manner, and for the purpose of effecting the proper supply of water to the hopper whenever the occupant of the seat shall permit the return of the parts mentioned to their original positions. But at the same time at which the valves j and n were respectively lifted and lowered, as just explained, the valve i was lifted from its seat, whereby communication was opened between the supplemental compartment G and the branch pipe H, and as the result of this operation the whole contents of the compartment G were emptied into the hopper. Thus a preliminary flushing or thorough wetting of the walls of the hopper, it will be seen, must have occurred at the moment of the depression of the seat by the occupant of the closet, and this preliminary flushing, it will be understood, has the positive effect of a preventive of the adherence of any excrement on the walls of the hopper, for the latter being thoroughly wetted any excrement which may be deposited thereon will not cling or stick thereto, and hence, even if the after-wash or the usual flushing after use of the hopper be defective or insufficient, the hopper will be left in a cleanly condition.

The compartment G should, of course, be made of a comparatively small capacity, (and its capacity may be predetermined according to the conditions of water-supply at the place where the contrivance is designed to be put up,) so that while the beneficial effects of the preliminary flushing of the hopper by the contents of said compartment shall be attained, such an economic use of water shall be made as circumstances may render desirable.

It will be understood, of course, that at the same time the valves j and n are returned to their original positions, by the releasement of the closet-seat from the weight of its occupant, the valve i becomes reseated, so as to prevent the escape from compartment G of any water, with which it may be resupplied, and that as soon as the water flowing into the main compartment E from the supply-pipe B shall have reached a level as high as the top of the partition that separates said compartment from that marked G the water will flow over said partition until compartment G shall have been refilled, when the water-supply will be automatically cut off by the closing of valve c in the usual manner, the tank-regulator being adjusted or adapted to thus close the supply-pipe B when the water in compartments E and G shall have reached a level very slightly above that of the top edge of the partition which separates said compartments.

The gist of my invention, it will be seen, rests in a capacity of the cistern or tank apparatus to automatically afford to the hopper a discharge of water at the moment of the setting of the valves for the accommodation of the usual supply to be used subsequently to flush the hopper with, whereby, in addition to the usual flushing, a preliminary flushing, or a wetting of the walls of the hopper prior to or during the deposit of excrement in the hopper is effected; and it will be understood that this effect may be produced, and that hence all the results and advantages of my invention may be attained without strictly following the details of construction which I have shown and described as constituting an apparatus embodying said invention.

I therefore wish it to be understood that I do not consider my invention to be restricted to or dependent on the particular form of apparatus shown and described. Neither should my invention be confounded with any of the prior contrivances in the art in which means are provided for effecting a constant discharge of water into the hopper from the moment at which the seat is first occupied, for such apparatuses differ widely in principle of construction and mode of operation from mine, in that if they be made to operate with a constant supply sufficient in the capacity of the jet or current to properly wet the walls of the hopper and prevent the difficulty overcome by a preliminary flushing of the walls they must be so wasteful of water as to be of no practical use in places where the consumption of water must be taken into consideration; and if they be made to operate with a reasonably small amount of constant wash it is impracticable to properly wet or flush the walls of the hopper so as to accomplish in any material degree the objects and advantages of my invention.

Having so fully explained my invention, and the best mode now known to me of carrying out the same, that any one skilled in the art can make and use a water-closet system according thereto, what I claim as new, and desire to secure by Letters Patent, is—

A water-closet cistern or supply-tank provided with means for effecting, in addition to the usual flushing and after-wash, (accomplished after the use of the closet,) a preliminary flushing or wetting of the walls of the hopper in substantially the manner and for the purpose hereinbefore set forth.

WM. BUNTING, Jr.

Witnesses:
JACOB FELBEL,
J. H. JANVIER.